United States Patent [19]
Zamorano

[11] 3,732,715
[45] May 15, 1973

[54] APPARATUS FOR PRESSING CONNECTOR MEMBERS ON STRUCTURAL ELEMENTS

[76] Inventor: Luis Ramírez Zamorano, San Borja 1358, Mexico City, Mexico

[22] Filed: July 22, 1970

[21] Appl. No.: 57,156

[30] Foreign Application Priority Data

Mar. 4, 1970 Mexico.................................117,734

[52] U.S. Cl. .........................72/253, 29/282, 29/517
[51] Int. Cl. ..............................................B21c 23/00
[58] Field of Search ...................29/517, 282; 72/253

[56] References Cited

UNITED STATES PATENTS

| | | | |
|---|---|---|---|
| 1,430,399 | 9/1922 | Parsons et al. | 72/253 |
| 1,430,400 | 9/1922 | Parsons et al. | 72/253 |
| 2,026,774 | 1/1936 | Davis et al. | 29/517 UX |
| 2,978,263 | 4/1961 | Walsh et al. | 29/517 X |
| 3,392,562 | 7/1968 | Fuchs | 72/253 |
| 3,304,602 | 2/1967 | Osborne | 29/517 UX |
| 3,420,085 | 1/1969 | Pratt et al. | 72/253 |
| 3,553,996 | 1/1971 | Sabroff et al. | 72/253 |
| 3,559,270 | 2/1971 | Beghi | 29/517 X |

FOREIGN PATENTS OR APPLICATIONS 363,464  9/1962  Switzerland...........................29/517

Primary Examiner—Charlie T. Moon
Attorney—Stevens, Davis, Miller and Mosher

[57] ABSTRACT

An extrusion die assembly having a composite extruding bore comprising a flared entrance section with a radius of curvature of approximately 0.2 times the diameter of the extrusion bore, a first conical extruding section which wall forms an angle about the axis of preferably 12°, a second conical extruding section with its wall forming an angle of preferably 6° about the axis, a third cylindrical extruding section with its wall forming an angle of 0° about the axis, an expanded section of a diameter substantially larger than the extruded diameter of the connector member, and a cylindrical guiding outlet section having a diameter slightly larger than the diameter of said cylindrical extruding section.

An apparatus for extrusion pressing connector members on structural members, which comprises a pair of dies as described above, a hydraulic cylinder and piston assembly, a pushing member attached to said piston, means for removably maintaining said dies in its operative position, and means for removing said dies from its operative position to a mutually spaced position to enable the removal of the extruded assembly.

7 Claims, 23 Drawing Figures

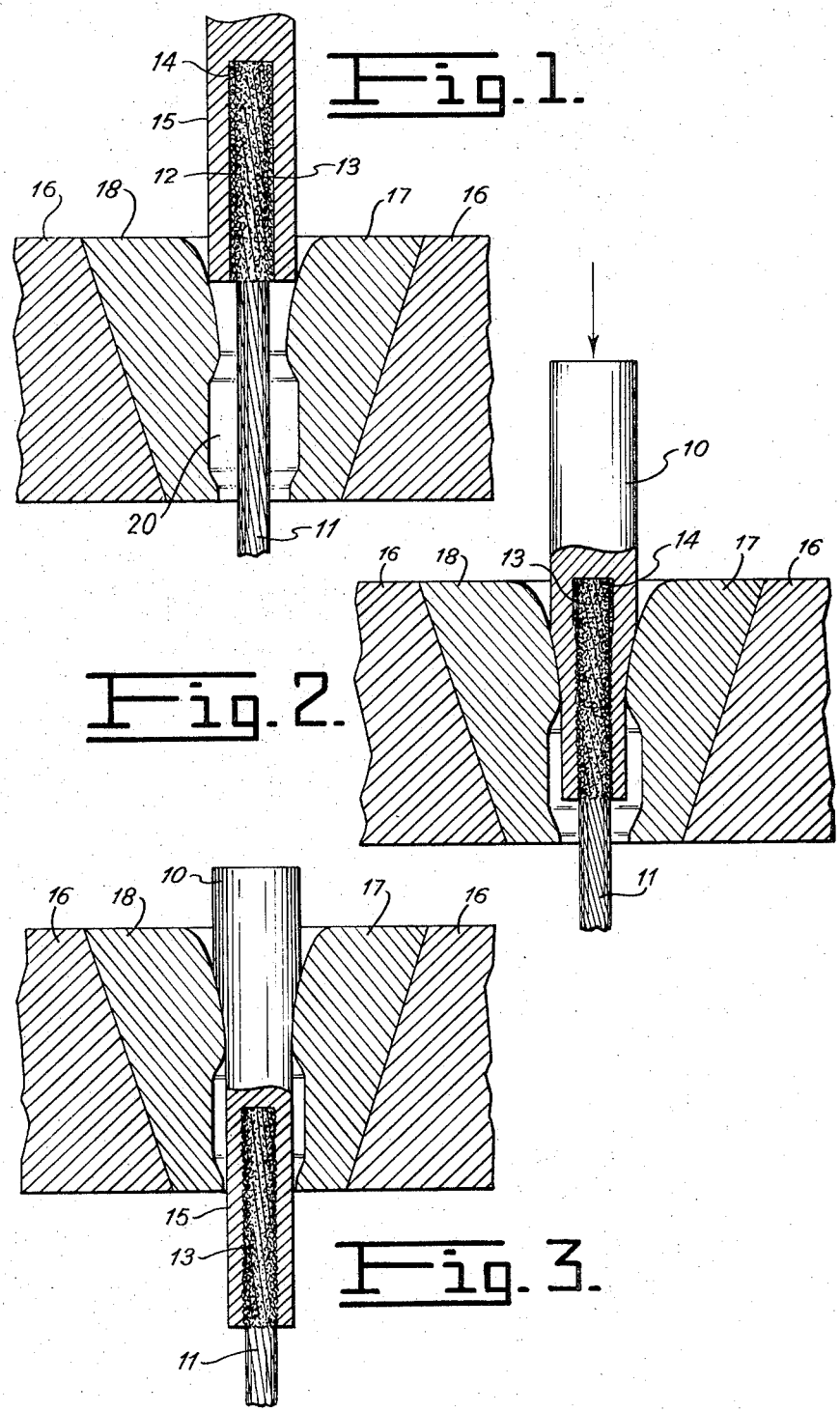

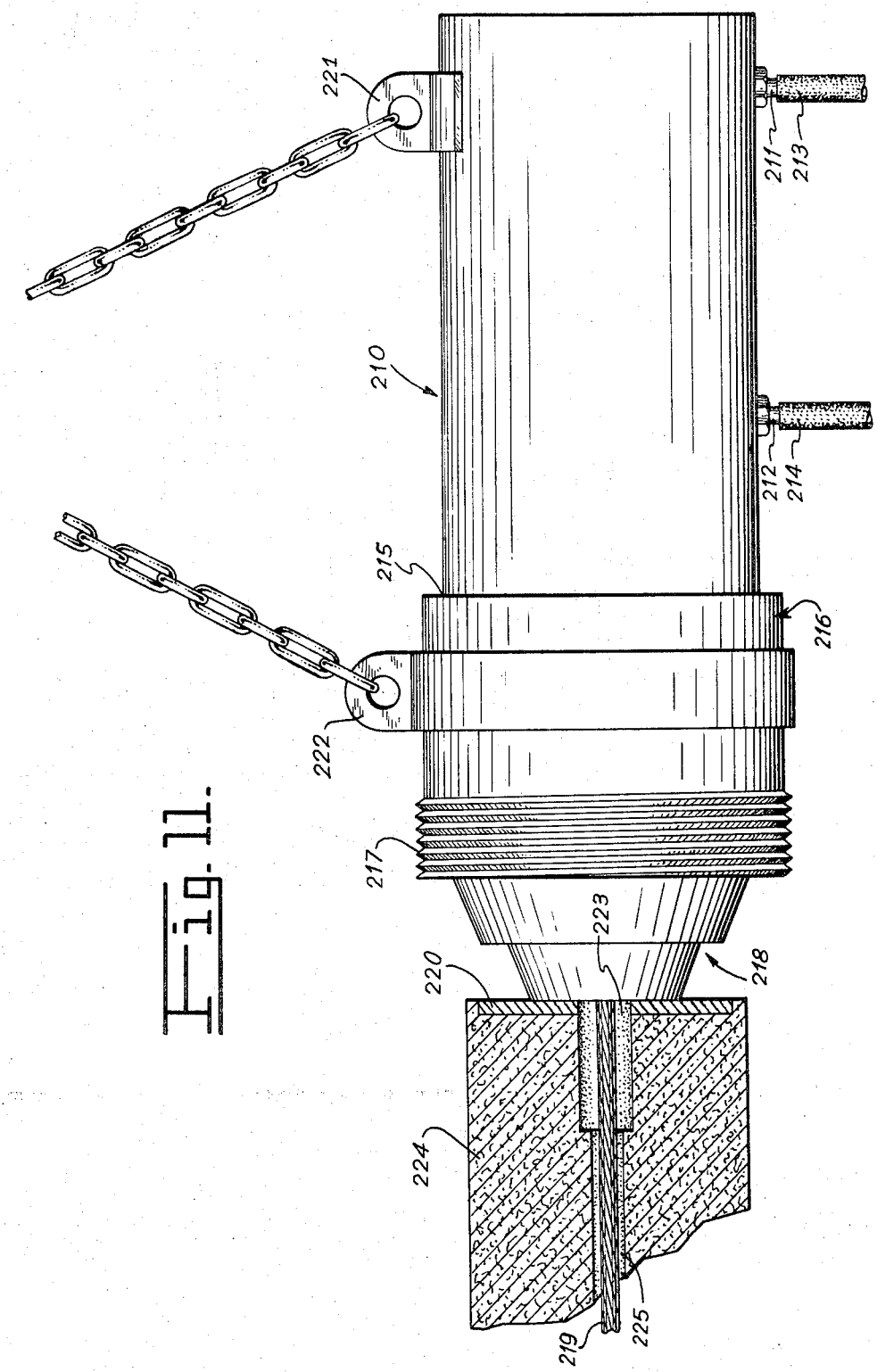

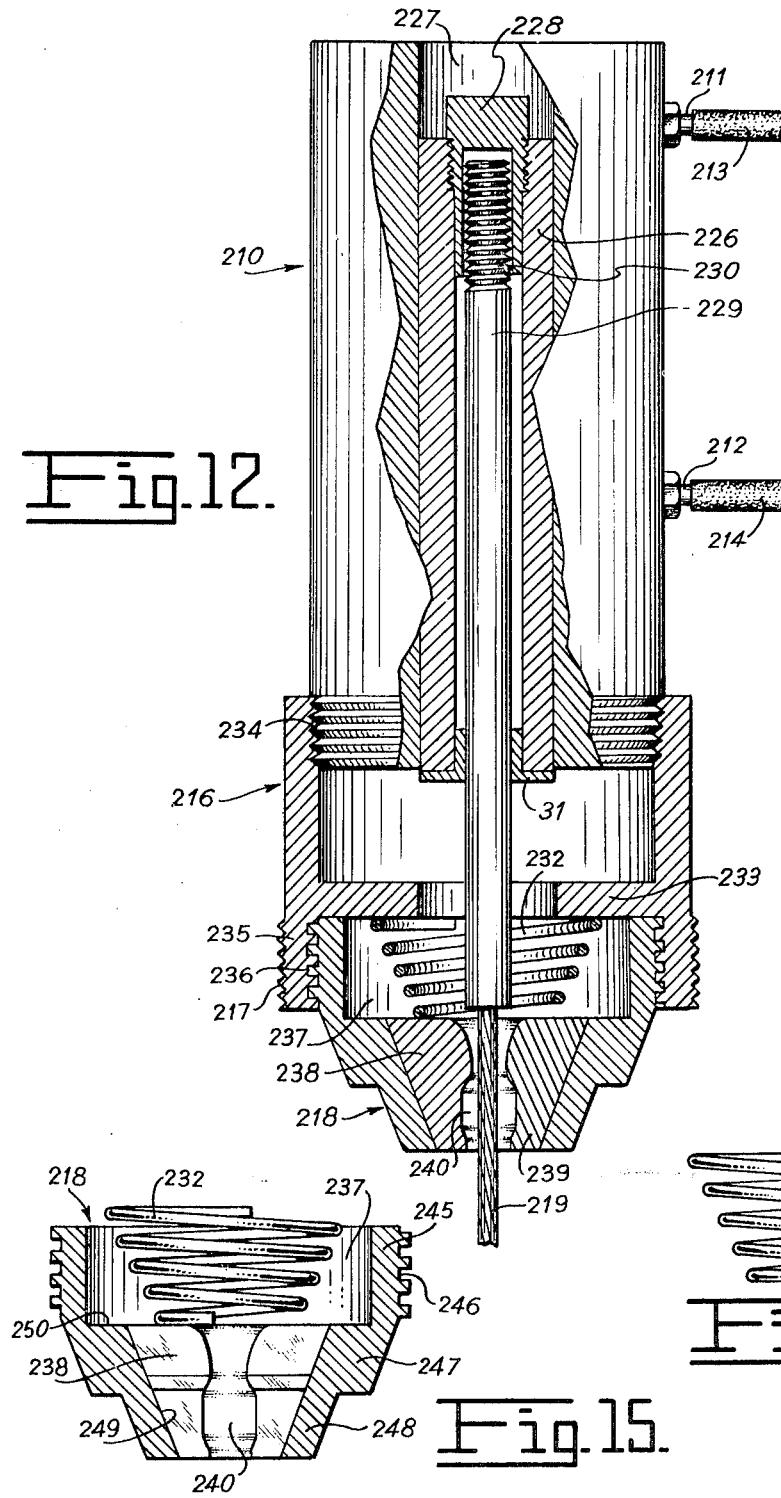

APPARATUS FOR PRESSING CONNECTOR MEMBERS ON STRUCTURAL ELEMENTS

BACKGROUND OF THE INVENTION

The present invention refers to the building art and, more particularly, it relates to a method of pressing connector members on the tips or on intermediate portions of a structural element such as a cable, a rod, a wire and the like, as well as to an extruding die assembly and to an apparatus for carrying out said method.

Connector members of the type described for wire, cable or rod, are well known to the prior art. Said connectors, however, as far as applicant knows, are usually fastened to the cables by means of the preparation of one of the ends of said connector in order to provide a bore of a diameter and a length suitable to permit the introduction of the end of the cable into said bore, and the pressing of said connector through the use of a die press having a capacity of several hundred tons, so as to reduce the diameter of said bore and to force the material of the connector to flow until it firmly bears on the surfaces of the cable and tightly fastens the same through friction stresses.

Anyone skilled in the art will easily conclude that, the higher the pressure exerted on the connector, the larger the fastening strength and the greater the tensil strength provided to the thus formed joint or coupling. However, there is a compromise between the larger coupling strength achieved through the use of a higher pressure, and the consequent reduction of the thickness of the walls of said connector member at the higher pressure thus applied. In other words, if the pressure applied on said connector member is too high, while the thus generated friction stresses between the inner walls of the connector bore and the outer walls of the structural member will be satisfactory, the reduction in the thickness of the wall material of said connector member will be unduly large, upon the plastic flow of said material caused by said pressure, and thus said reduction in the thickness can be sufficient to weaken certain portions of the connector member which therefore will tend to crack under abnormally lower tensil stresses, thereby impairing the strength created by friction between the connector and the cable.

Thus, it has become generally necessary to effect an accurate calculation of the necessary pressure to fasten a particular connector member to a structural element such as a cable, a rod or a wire and the like, inasmuch as, if the pressure is low, the friction stresses will be minimized and therefore the coupling will not possess the necessary tensil strength, while on the other hand, if the pressure is too high, even when the friction stresses will be adequate to provide for a good tensil strength, the thickness of the connector material will be remarkably reduced, with the consequent possibility of creating cracks in the more affected parts of the crystallographic structure of said material, with which said coupling will be completely spoiled. Consequently, there is an optimum point at which a nearly perfect coupling is achieved between a connector member and a structural element such as a cable, a rod or a wire, beyond which the coupling strength is weakened through thinning of the material, and below which the coupling strength is weakened through failure to create a sufficient friction stress.

The machines generally used to fasten connector members on structural elements such as cable and the like, comprise a die set including a pair of die sections of semicylindrical shape, engaged by the plunger and the platen of a high capacity press. Said die sections are provided with a complementary cavity of suitable form to act on the connector member. The cavities of the die sections, of course, will be of a diameter smaller than the starting diameter of the connector, and since said die sections are applied one against the other on both sides of the connector member, if excessive pressure is applied, the material of the connector will be squeezed out of said cavities toward the flat sections of the die, thereby forming lateral projections in the form of longitudinal ribs which flow outwardly of said connector. It will be rather obvious that the elastic limit of the material will be easily exceeded within said longitudinal ribs, which thereby form serious cracks. Even if afterwards the connector is rotated 90° to carry out a further pressing step, and even when said further pressing step may apparently correct the form of the pressed connector, the zone already affected by the first pressing step will remain weakened beyond any remedy.

The above represents perhaps the most serious disadvantage of the prior art pressing methods and apparatus for fastening connector members or ferrules on structural elements such as cable, rod, wire and the like, and it will be obvious that, in order to avoid said drawback, a highly skilled operator is required to operate the press.

From the above it will be clearly seen that the prior art methods and apparatus for fastening a connector member to a cable, rod or wire and the like, have left much to desire, inasmuch as the strength of said coupling will depend on how near the conditions are to an optimum compromise point which must be determined for each class of material or form of connector. The strength of the coupling will also depend on how great a care was exercised in the necessary pressing steps to avoid deformation of the connector beyond the elastic limit of the material forming it, with the consequent cracking of certain excessively deformed zones beyond any remedy. The control of the above conditions is very difficult and the optimum conditions are seldom achieved, with the consequent production of defective coupling showing serious drawbacks when used in the building art, such as in the support of bridge structures and the like, in which a coupling of the above mentioned type must be nearly perfect so as to provide for the necessary tensil strength in the cables from which the bridge hangs, in order to avoid a catastrophe.

It may be concluded that most of the failures and drawbacks shown by the prior art couplings are due to the fact that said couplings solely depend on the principle of fastening both members through friction stresses between two smooth surfaces, for instance of steel members, so that the strength of the coupling will exclusively depend on the pressure exerted, provided that said pressure is not excessive so as to unduly reduce the thickness of the material forming the connector, or so as to unduly deform the same beyond the elastic limit of the material.

In view of the disadvantages of the prior art couplings, workers in the art have been for long looking for a coupling of the above described character which will not solely depend on friction stresses generated by pressing the connector member on the structural element, so as to avoid the need of applying an excessive pressure which will tend to reduce the thickness or otherwise weaken the material forming the connector or the structural element, while at the same time producing a coupling having a very large tensil strength without weakening or otherwise affecting the strength of the material.

On the other hand, the processes for pressing ferrules or connectors on structural elements such as cables, rods and wires, in accordance with the prior art, have generally required utilization of machines provided with a great capacity, and more particularly presses of several hundreds of tons which operate with dies of suitable shape to achieve pressing of the ferrule, said dies being oppositely applied on both sides of the ferrule within which the structural member has been previously inserted. An operation of this type, as will be obvious to anyone skilled in the art, cannot be effected in a single step and the ferrule-structural member assembly must be rotated about its axis several times with intermediate pressing operations until the diameter of the ferrule is reduced in an amount suitable to tightly engage the structural member. This may be considered as a rather difficult operation which generally requires to effect the pressing process at the plant, since in the first place the presses used are quite large and, on the other hand, the operation of rotating the assembly and repeatedly pressing the same must be effected with a somewhat complicated and preferably automated equipment which is not susceptible to being easily transported to the site where the assemblies are to be used.

In view of the disadvantages shown by the above mentioned apparatus, workers in the art have also been for long looking for a simple portable machine which will not require complicated auxiliary equipment and which will effect pressing of the assemblies in a single pressing step, without any alteration in the crystallographic structure or in the strength of the materials involved.

SUMMARY OF THE INVENTION

The present invention provides an improved apparatus for extrusion pressing, at relatively low pressure, connector ferrules on structural elements such as cables, rods and wires, which will be of very simple construction, of economical operation and which will possess highly portable characteristics to enable the carrying out of the method at the site where the assemblies are to be used.

The invention also provides an improved apparatus which will enable placing of a connector ferrule not only on the tips of a structural member, but also on intermediate portions thereof without the need of modifying the dies or any other element of the apparatus.

The invention more particularly provides an improved apparatus of the above mentioned character, having means for easily spacing the dies in order to insert and remove the ferrule-cable assembly through the outlet opening of the extruding assembly.

The invention also provides an extruding assembly of very simple construction to be used with an apparatus of the above mentioned character, which will provide for the automatic placement of the dies in its extruding position, while at the same time providing for the spacing of the dies without the need of using complicated tools, if any, to effect said operation.

DESCRIPTION OF THE DRAWINGS

The features that are considered characteristic of the invention will be set forth with particularity in the appended claims. The invention itself, however, both as to its organization and its method of operation, together with additional objects and advantages thereof, will best be understood from the description of certain specific embodiments, when read in connection with the accompanying drawings, in which:

FIG. 1 is a fragmentary, somewhat diagramatic elevational view of a ferrule and cable assembly being passed through an extruding die assembly shown in a first position, prior to applying pressure on the ferrule to extrude the same;

FIG. 2 is a view similar to FIG. 1, but showing the ferrule and cable assembly partially forced through the extruding bore of the dies;

FIG. 3 is a view similar to FIGS. 1 and 2, showing the ferrule and cable assembly in its completely extruded position with the ferrule tightly pressed on the cable;

FIG. 11 is an elevational view of the general assembly of a unitary highly portable machine for extruding ferrules on structural members, built in accordance with a second and preferred embodiment of the invention, showing the machine in an operative position in connection with a concrete structural member;

FIG. 12 is a cross sectional elevational view, of the extrusion machine built in accordance with the embodiment shown in FIG. 11;

FIG. 14 is a view of the spring provided to maintain the dies in its operative position;

FIG. 15 is a cross sectional elevational view of the extruding section of the machine in accordance with this embodiment of the invention, showing the position of the spring of FIG. 14;

DETAILED DESCRIPTION OF THE DIFFERENT EMBODIMENTS

Figure 4:
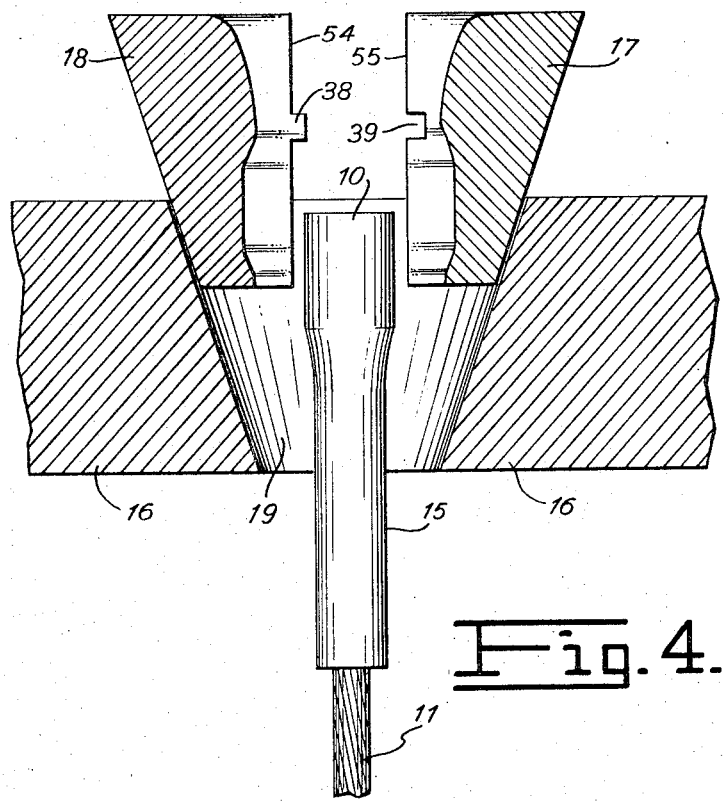
FIG. 4 is a view similar to FIGS. 1 to 3, showing the dies in its spaced position and the connector being removed from the extruding assembly.

Having now more particular reference to the drawings, and still more particularly to FIGS. 1 to 8 thereof, there is shown illustratively a ferrule 10, together with a cable or any other type of supporting member 11, which tip section 13 is introduced within the bore 14 of ferrule 10, so as to produce a pressure coupling between both members. The supporting member or cable 11, in its coupling section 13, can be prepared by means of the deposition of a plurality of abrasive particles 12, such as illustrated in FIG. 1 of the drawings, or it can be unprepared.

The ferrule and cable assembly 10, 11, such as shown in FIG. 1 of the drawings, is subjected to a force applied to the end of ferrule 10, so as to force said ferrule 10 to enter through the die opening 20, which special shape will be described hereinbelow, to the effect that due to its passage through said opening, such as illustrated in FIGS. 2 and 3 of the drawings in different stages, the end section 15 of ferrule 10 is reduce in its diameter in order to tightly bear on coupling section 13 of cable 11, through the closing of the cavity or bore 14 of the ferrule, which is gradually crimped on cable 11 such as illustrated in FIG. 2, in order to produce a tight coupling between both parts.

The die used in accordance with the present invention is preferably formed of several die sections, such as those illustrated by means of the reference characters 17 and 18 in the different figures, said die being supported on a suitable support 16, which may be of any nature, provided that it permits separation of the die sections such as 17, 18, of the die used.

In order to carry out the process for the extrusion of a connector or ferrule on a cable or the like in accordance with the present invention, the cable 11 is placed within the bore 14 of the ferrule 10, as illustrated in FIG. 1, and the assembly is forced through opening 20 of the die, until the distance travelled by said assembly is sufficient to completely close bore 14 and thereby press the cable 13 within the cavity of portion 15 of said ferrule 10. After the assembly is duly pressed, it will be in the position indicated in FIG. 3 of the drawings, and the pressure exerted is relieved to the effect that the die sections may be removed from the cavity 19 of support member 16 to thereby free the non-affected portion of the ferrule 10, and enable the removal of the assembly through the die, once said assembly has been completely pressed.

Figure 5:
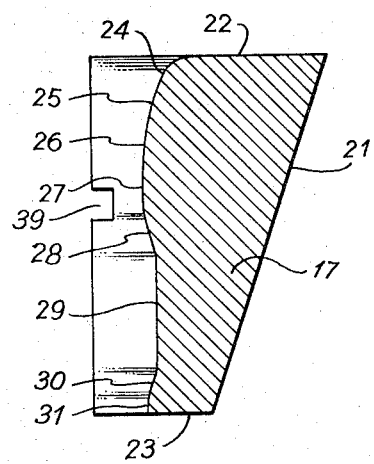
FIG. 5 is a cross sectional elevational view of one of the extruding dies, showing the different extruding sections of the extruding bore.

In order to carry out with high efficiency the extrusion process in accordance with the present invention, an extruding surface is required such as that shown in FIG. 5 of the drawings. The extruding surface of the dies of the present invention is formed, as clearly shown in FIG. 5 of the drawings, by a flat upper surface 22 which does not intervene in the extrusion process, followed by a downwardly curved section 24, which generally preferably is provided with a radius of curvature of about 0.2 times the diameter of the extrusion bore. The curved section 24 is followed downwardly by a frustoconical portion 25 with its wall forming an angle about its axis of approximately 11 to 15°, preferably 12°, said surface 25 being continued downwardly by a second frustoconical surface 26 with its wall forming an angle about its axis of approximately 6° to 7.4°, preferably 6°, with said surface 26 being followed by a cylindrical surface 27, that is, a surface forming an angle of 0° about its axis, which provides the surface of minimum diameter equivalent to the diameter to which the ferrule 10 is brought when forced through the extruding bore.

Following surface 27, there is provided an outwardly curved surface 28 which relieves the pressure exerted by the extruding bore on ferrule 10, thereby forming a cavity 29 which is bounded by a lower inwardly curved surface 30, all this section of the die cavity being spaced from the ferrule 10.

Finally, and in order to avoid warping of the extruded ferrule when passing through the section of the die, there is provided a cylindrical guiding section 31 having a diameter 0.2 to 0.6 mm larger, preferably 0.4 mm larger than the diameter of section 27 of the extrusion bore.

By providing an extruding surface in accordance with the above, maximum efficiency is achieved in the process, and at the same time the use of a minimum pressure is also possible to produce a reduction in the diameter of the ferrule 10 and the pressing of cable 11 placed within the same. At the same time, the assembly does not warp, in view of the provision of the guiding surface located at a suitable distance from the extruding surface, whereby the assembly is duly guided to produce a properly straight assembly without any possible deformation, such as clearly shown in FIG. 4 of the drawings.

The die assembly in accordance with the present invention is inserted in a frustoconical bore 19 provided in the supporting block 16, and the angle of wall 19 of the die reception bore is preferably of from 20° to 25° about its axis, for an objective which will be clearly described hereinbelow.

Figure 6:
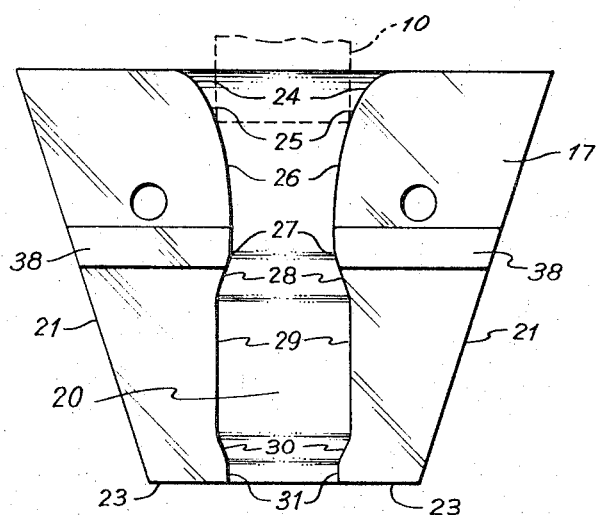
FIG. 6 is an elevational view of one of the dies of the extruding assembly, taken at 90° with respect to the view shown in FIG. 5.
Figure 7:
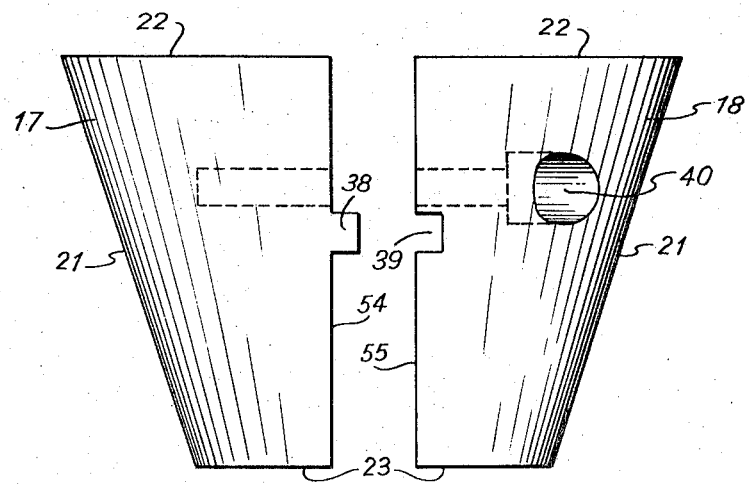
FIG. 7 is an elevational view of the complete die assembly used in accordance with the present invention, clearly illustrating the coupling means of the two dies which provide for avoiding axial displacement of the same relative to each other.
Figure 8:
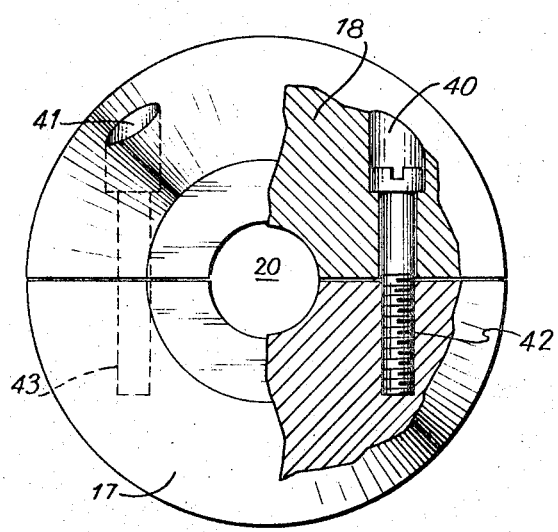
FIG. 8 is a top plan view, partly broken away to show inner details thereof, of the extruding assembly shown in FIG. 7, and illustrating the engaging means which allow the machining of said assembly in one piece.

The die assembly built in accordance with the present invention is more clearly shown in FIGS. 6, 7 and 8 of the drawings. Said die assembly comprises a pair of die sections 17 and 18, the die section 17 having an integral spline 38, in order to form the male of the assembly, and the die section 18 having a groove 39, complementary to the spline 38, in order to form the female of the die assembly. The spline and groove set 38, 39, provided on the flat faces of the die sections 17 and 18, are intended to maintain the two die sections, in operation, in an accurate axial position relative to each other, in order to avoid displacement of the sections relative to one another in the axial direction, and in order to avoid possible fractures or damages caused by the pressure exerted by the coupling tip 15 of ferrule 10, when the latter is forced into the extruding bore. Therefore, wall 54 of the male die 17 is provided with a spline or intermediate rectangular rib 38, while the flat wall 55 of the female 18 of the die is provided with a complementary groove 39 in order to receive therewithin the rib 38 of the other section.

The conical wall 21 of the die according to the present invention is arranged at an angle about the axis which must be exactly the same as the angle formed by wall 19 of the supporting block 16, in order to obtain an accurate engagement of both surfaces so as to avoid undesirable spacing between the two die sections 17 and 18 and its possible fracture caused by the change of a circular section into an oval section. This is also necessary in order to avoid formation of side fashes in the extruded portion 15, inasmuch as if walls 54 and 55 are spaced, the material of the end 15 of the ferrule will tend to flow into the thus formed slots, producing fashes which impair the quality of the finished article.

The upper and lower walls of the die are perfectly circular and flat such as illustrated at 22 and 23 in the drawings. These surfaces, therefore, will be perfectly flush, in operation, with the upper and lower walls of the supporting block 16 as shown in FIG. 1.

In order to enable fabrication and machining of the die of the present invention, the holes 40 and 41 are provided with threaded ends 42 and 43, so as to permit the engagement of the die sections 17 and 18 together by means of suitably threaded bolts, to thereby allow machining of the assembly or repairing operations thereof. Once these operations have been effected, the bolts are removed from the holes 40 and 41, and the two die sections are used without said bolts as shown in FIG. 4 of the drawings, with its accurate relative position being secured by the spline and groove set 38, 39.

The provision of an angle of between 20° and 25° in wall 21 of the die and wall 19 of the die receiving cavity of block 16 is intended to permit, when the pressure exerted in ferrule 10 is relieved, the spacing of the die sections 17 and 18 upwardly of the surface 19 of the die receiving cavity, with a snap action, so as to obtain sufficient spacing of the two die sections to allow the removal thereof and enable the removal of the ferrule 10 which can then be pulled out of the lower end of the supporting block 16 as is necessary with ferrule and cable assemblies as those handled in this type of process.

If the angle formed by walls 21 or 19 is smaller than the above mentioned range, the die will not be snapped out of the cavity when the pressure is relieved, and instead will remain tightly inserted in cavity 19, thereby rendering it necessary to use a suitable extracting tool to remove said die. On the contrary, if the angle is larger than the above mentioned range, then the die sections will tend to slide out of the cavity during the extrusion operation because of the resulting force laterally exerted by the pressure of the ferrule walls, thereby causing spacing of the die sections 17, 18, with a consequently defective extrusion operation.

The process of the present invention can be carried out, and the die assembly can be used, in any type of machine, but the apparatus which will be described hereinbelow is preferable in order to obtain a product of a high quality and with the maximum of efficiency.

Figure 10:
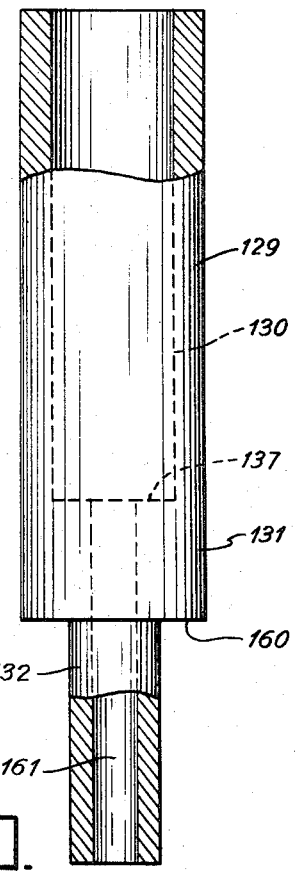
FIG. 10 is an elevational view, partly in section, of a pusher device used with the press built in accordance with the first embodiment of the invention.
Figure 9:
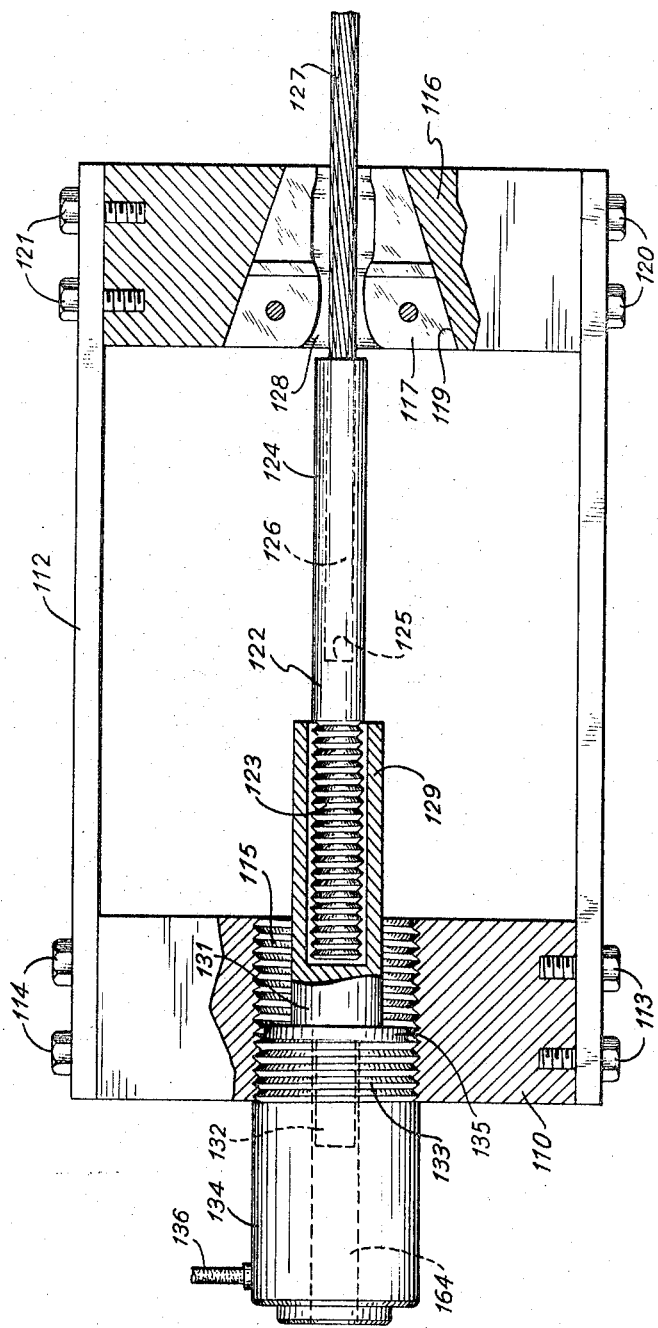
FIG. 9 is an elevational view, partly broken away to show inner details thereof, of an improved portable machine built in accordance with one embodiment of the invention and showing the ferrule and cable assembly in its position prior to extrusion of the same.

According to one embodiment of the invention, illustrated in FIGS. 9 and 10 of the drawings, there is shown a highly simplified extrusion press built in accordance with one embodiment of the invention and particularly adapted to extrude a connector or ferrule on a structural element such as a cable.

The machine according to this embodiment of the invention comprises a pair of side plates 111 and 112 supporting at both ends a pair of blocks, namely, a block 110 to support the movable parts of the press, and a block 116 to support the extrusion dies.

The block 110 is fastened to plates 111 and 112 through the provision of a plurality of holes through which screws 113 and 114 are threadedly engaged to the block 110 by means of complementary threads, such as clearly illustrated in FIGS. 9 of the drawings.

On the other hand, the die supporting block 116 is fastened to the other ends of plates 111 and 112 by the similar provision of holes and screws 120 and 121, thereby forming a rectangular frame on which the elements of the press in accordance with this embodiment of the invention are duly supported.

While FIG. 9 illustratively shows a rectangular frame formed by plates 111 and 112 and supporting blocks 110 and 116, it will be obvious to anyone skilled in the art that this rectangular frame can be built in many different forms, provided that the two blocks 110 and 116 are provided in the relative position shown. Thus, for instance, said blocks can be engaged by means of a plurality of rods having threaded ends to receive a pair of nuts at each threaded end thereof, with which variation in the relative distance of blocks 110 and 116 may be provided by the displacement of the nuts on the threaded ends of the rods at will. Many other forms will be very easily devised by anyone skilled in the art without thereby departing from the scope of the invention.

Block 110 is provided with a threaded bore 115 to engage the externally threaded lower portion 133 of a hydraulic of pneumatic cylinder 134, which can of course also be replaced by a lever device which may exert a pushing force such as will be described in more detail hereinbelow.

In the illustrative embodiment shown in FIG. 9, the hydraulic or pneumatic cylinder or jack 134 is engaged with its head introduced within the threaded bore 115 and its upper portion directed outwardly of the block 110. The pressurizing fluid is fed into cylinder 134 through an inlet 136 in order to lower or raise piston 135 of said hydraulic or pneumatic cylinder. The cylinder is built with a bore passing from one end to the other, such as illustrated at 164 in FIG. 9, for a purpose which will be described in more detail hereinbelow. Within this axial bore 164 of cylinder 134, enters a plunger section 132 of a pushing device 131, the latter being provided, as more clearly illustrated in FIG. 10 of the drawings, with said upper plunger section 132, an outwardly directed shoulder 160, and a pushing section 129 of larger diameter, and provided with a hollow tubular cavity 130 having a bottom section 137 of a shape suitable to receive within the same the free end of a ferrule which is to be coupled with a structural element in accordance with the present invention. Preferably the pushing member 131 is provided with an axial bore 161 from the bottom 137 of cavity 130 to the free end of plunger 132, for a purpose which will be clearly comprehended in what follows.

Shoulder 160 of the pushing member 131, bears on the lower surface of piston 135 of cylinder 134, so as to be pushed by said piston 135 when hydraulic or pneumatic fluid is fed through the inlet 136 of cylinder 134. Therefore, the pushing member 131 can be downwardly driven, with a suitable pressure, and it is within the cavity 130 of said pushing member 131 where the free end 123 of a ferrule or connector 122 is introduced as very clearly shown in FIG. 9 of the drawings.

Within the bore 125 of the ferrule or connector 122, a structural element 126 such as a cable, a wire, a rod or the like, is introduced such that it will be completely surrounded by the coupling section 124 of ferrule 122. If the coupling of a connector member 122 is required at an intermediate portion of a cable 127, then said cable 127 is passed through the axial bore 161 of the pushing device 131 and also through the axial central bore 164 of cylinder 134 in order to allow its free passage through the apparatus such that ferrule 122 may be placed at any intermediate section of the cable 127, prior to the coupling of both elements. The cable 127, of course, also passes through the extruding bore 128 of the die set 117, such as clearly shown in FIG. 9 of the drawings, and the connector member 122 is duly aligned with said extruding bore 128 in order to be extruded thereby.

The construction of the die supporting block 116 is entirely similar to that already described for block 16 of FIGS. 1 to 4 of the drawings and, therefore, a more detailed description of the same, as well as of the die sections, is considered unnecessary. This apparatus is perfectly adapted to carry out the extrusion process in accordance with this invention, by the mere action of the cylinder 134 to push the connector member 122 through the extruding bore 128 until the connector-cable assembly is duly fastened together, and then the pressure is released in order to carry out the remaining steps of the already described extrusion process.

Pushing devices of many different types and shapes can be used with the machine built in accordance with this embodiment of the invention, in order to fit any possible shape of ferrule or connector member to be pressed on a structural element, as will be clearly ascertained by anyone skilled in the art.

The apparatus shown in FIGS. 11 to 21 of the drawings corresponds to the most preferred embodiment of the invention, inasmuch as this apparatus provides a unitary, compact, highly portable, east-to-handle machine for carrying out the pressing operations necessary for the fastening of a connector member on a structural element in accordance with the invention.

The apparatus in accordance with this embodiment of the invention comprises a hydraulic cylinder 210 provided with fluid inlet and outlet conduits 211 and 212 connected by means of flexible pipes 213 and 214 to a hydraulic fluid pump (not shown), and provided with an engaging means 215 at its lower end, which in FIG. 11 of the drawings is shown as an outer thread. On the engaging means 215, a coupler section 216 is engaged, said coupler section being provided at its lower end with a thread 217, suitable for supporting the assembly, for instance, on a working table, a vertically arranged plate (not shown) or the like. At the lower end of coupler section 216, a die supporting member 218 is threadably engaged thereto, said die supporting member having an opening to allow the passage of the cable 219 to which a connector member or ferrule 229 is to be fastened, either at the site of utilization or on a working table or plate which can be moved to any place. The compact apparatus built in accordance with this embodiment of the invention can also be used as shown in FIG. 11, in a freely hanging position to allow it to be engaged to any structural member such as a concrete member 224. To this end, a pair of eyes 221 and 222 are provided, in order to hang the device from a chain or the like. The mouth of the apparatus is applied to a plate 220 embedded in the concrete member 224, for instance, so as to place the connector 229, as will be described hereinbelow, on cable 219, which passes through the bore 225, at the precise site where said cable 219 is to be used, say, for prestressing the concrete member. The latter is provided with an enlarged opening 223 to receive the connector member after pressing the same.

The hydraulic cylinder 210 used in the apparatus built in accordance with this embodiment of the invention is of a well known type, such as the "Enerpac" post-tensioning system manufactured by Applied Power Industries, Inc. or any other device of the same type. It comprises an annular hydraulic cylinder provided with a through bore 227 within which a hollow annular plunger 226 is driven. A suitable pusher member 228 is fixed at the upper end of the plunger 226, said pusher member being provided with a size and shape which will fit any size and shape of connector member 229, which in the illustrative case of the figures, is provided with a thread 230 to be coupled with a nut or any other similar element. At the lower end of plunger 226, a guiding insert 231 is arranged with a pressure fit, said guiding insert being of the flanged cylindrical form in the illustrative embodiment shown, but it being understood that said insert can be modified in accordance with the shape of ferrule 229, in order to guide the latter and avoid warping of the same caused by the force exerted by the pusher member 228 when the hydraulic cylinder 216 is driven as will be described hereinbelow.

By means of a thread 234, the coupler cylindrical member 216 is suitably placed at the lower end of the hydraulic cylinder 210, said coupler member being provided with an inwardly directed annular flange, illustrated at 233, having a central hole through which the plunger 226 can pass, and serving to support the upper end of a coiled spring 232 which lower end bears on the upper surface of the dies 238 and 239 inserted in the die supporting member 218.

The die supporting member 218 has a frustoconical shape and is engaged by means of the thread 236, to the cylindrical projection 235 of the coupler member 216. A chamber 237 is thereby provided for containing and allowing motion of the spring 232 and dies 238 and 239, and an extrusion bore 240 is also provided, through which the ferrule 229 is forced in order to extrude the same and press it on the cable 219 as will be described hereinbelow.

Figure 13:
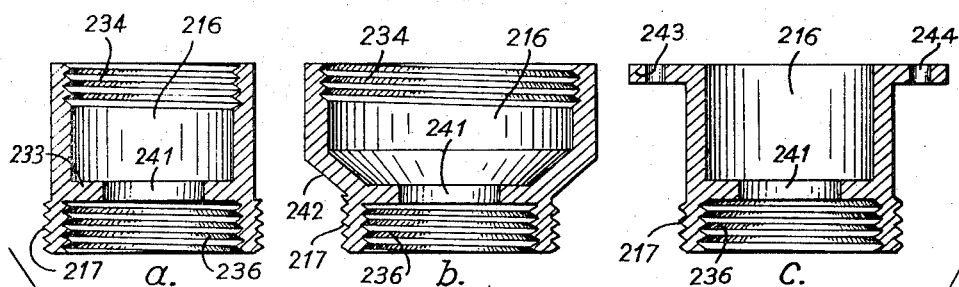
FIG. 13 illustrates three different cross sectional elevational views of the member used to couple the hydraulic cylinder and the extruding section of the machine in accordance with this embodiment of the invention.

The coupler member 216 used in connection with the apparatus in accordance with this embodiment of the invention can adopt a multiplicity of different shapes, in accordance with the operation requirements, as well as the relative size of the hydraulic cylinder 210 and the die supporting member 218. This coupler member is illustrated in FIG. 13 of the drawings and, for instance, is of a cylindrical form as shown in FIG. 13a, with an inner thread 234 at its upper end to engage the thread 215 of the hydraulic cylinder 210 and with an outer lower thread 217 to be coupled, for instance, to a working table or the like, and an inner lower thread 236, preferably of the quick opening type, to quickly engage within the same the die supporting member 218. Coupler 216 can also adopt the shape shown in FIG. 13b in the form of a reduction with a frustoconical portion 242, or it can also adopt the form illustrated in FIG. 13c with a flange 243 at its upper end, said flange being provided with a plurality of holes 244 to be coupled with a complementary flange provided at the lower end of the hydraulic cylinder 210.

FIG. 15 shows in detail the die supporting section or member of the compact machine in accordance with this embodiment of the invention. Said member comprises an upper cylinder portion 245 having an outer thread 246, preferably of the quick opening type, and forms a chamber 237 for containing the spring 232, said chamber being provided at its lower end with shoulder 250 which is flush with the upper surfaces of the dies 238 and 239. The dies 238 and 239 are entirely similar to the already described dies and are inserted within a frustoconical opening 249 provided in the portion 247, 248 of the die supporting member 218 as clearly illustrated in FIG. 15. The spring 232 is of a frustoconical shape and the lower end thereof has a smaller diameter to bear on the upper surfaces of the dies 238 and 239 while its upper end, of a larger diameter, bears on the lower surface of flange 233 of the coupler member 216 in accordance with the above.

Since every operation of the process in accordance with the present invention, must be carried out in the machine of this embodiment through the opening 240 of the dies, it being necessary to also remove the already extruded assembly through said opening 240, it becomes necessary to remove the dies 238 and 239 from its extruding position, from the outside of the machine.

Figure 16:
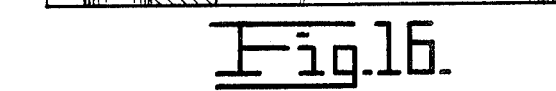
FIG. 16 is an elevational view, partly in section, of a pushing tool which is used for removing the dies from its operative position when it is desired to remove the pressed ferrule and cable assembly.
Figure 17:
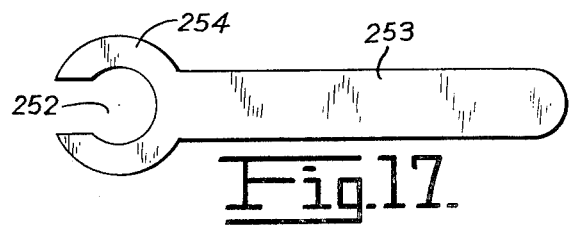
FIG. 17 is a bottom plan view of the tool shown in FIG. 16.

In order to enable the carrying out of said die removing operation, there is provided a pushing tool clearly illustrated in FIGS. 16 and 17 of the drawings. This tool can adopt many different shapes but preferably is a member provided with a handle 253 and a fork portion 254 having a central bore 252 and a slot at its end to allow passage of the cable. This tool is inserted such that the cable will enter through the slot, to be placed centrally of the bore 252, and is applied as clearly shown in FIG. 22 of the drawings, against the bottom surface of the dies, in order to push the lower ends of said dies 238 and 239 so as to remove the same from its extruding position, upwardly of cavity 237 and against the bias of spring 232.

Figure 18:
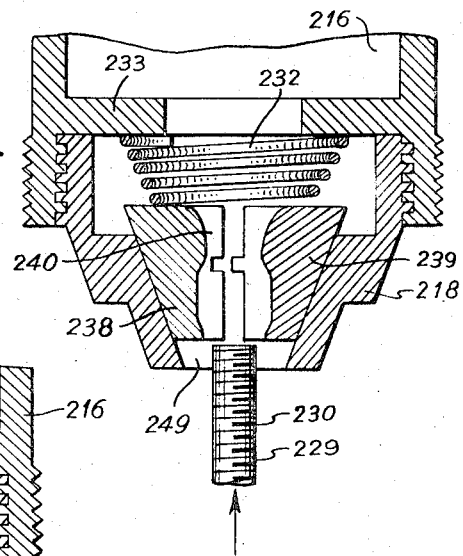
FIGS. 18 to 22 represent fragmentary cross sectional elevational views of the lower extruding section of the machine built in accordance with this embodiment of the invention, and illustrating the sequence of steps which comprise the process for extruding ferrules or connectors on structural elements such as cable, rod and wire.
Figure 19:
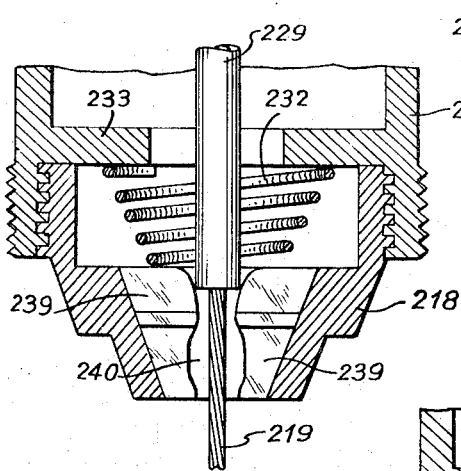
Figure 20:
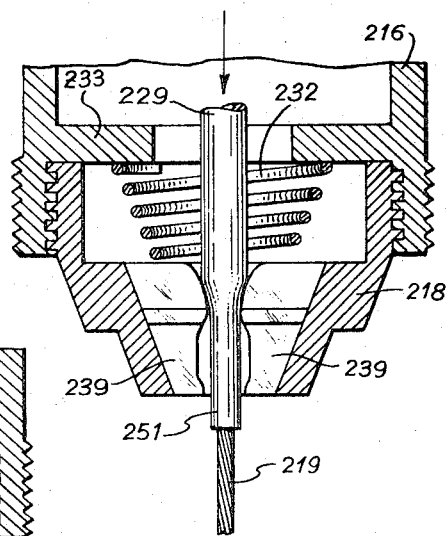
Figure 21:
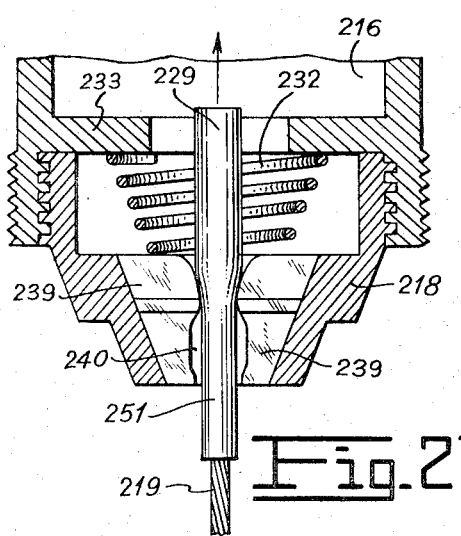
Figure 22:
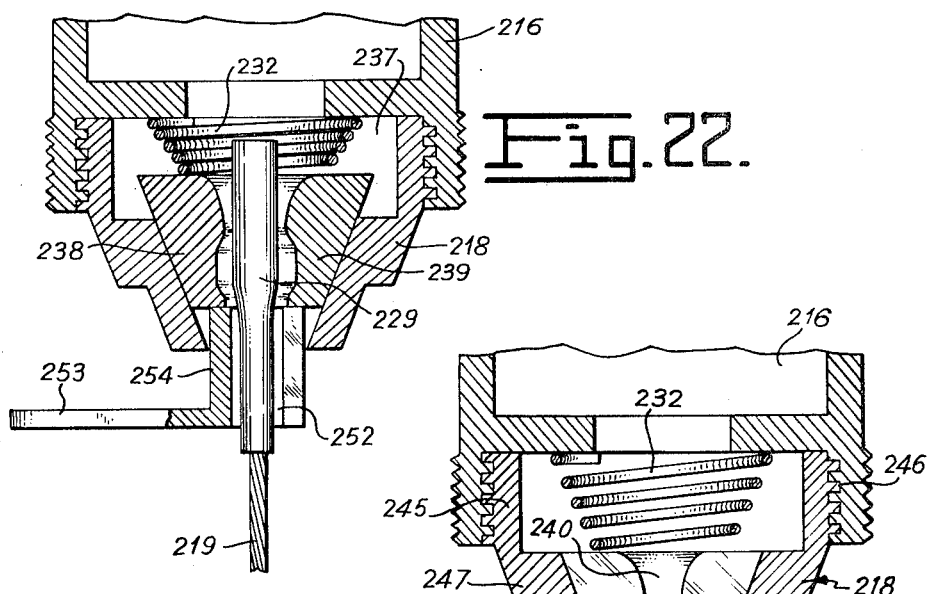

The different steps of the process of the invention, effected in the machine built in accordance with this embodiment, are clearly shown in FIGS. 18 through 22 of the drawings. FIGS. 19, 20 and 21 show the already described steps of extruding the connector member 229 on the cable 219, while the only different steps as compared with the already described extrusion process are illustrated in FIGS. 18 and 22.

In order words, in order to start the process in accordance with the invention, through the use of the machine of the present embodiment, the first step is to insert the connector member 229 inwardly through the extruding bore 240, by pushing with said connector member on the outer surface of the dies 238 and 239, in order to displace the same as illustrated in FIG. 18 and enable the entrance of said connector member into the apparatus, to be arranged in a position such as that shown in FIG. 19, ready to start the extruding operations. When the already described extruding operations are completed, the pushing tool of FIGS. 16 and 17 is inserted through the mouth of the die supporting member, as described above, and as clearly shown in FIG. 22 of the drawings, to thereby remove the dies 238 and 239 from its extruding position and enable the removal of the connector member 229 through the extruding bore, the diameter of which has been increased by the displacement of the dies.

Figure 23:
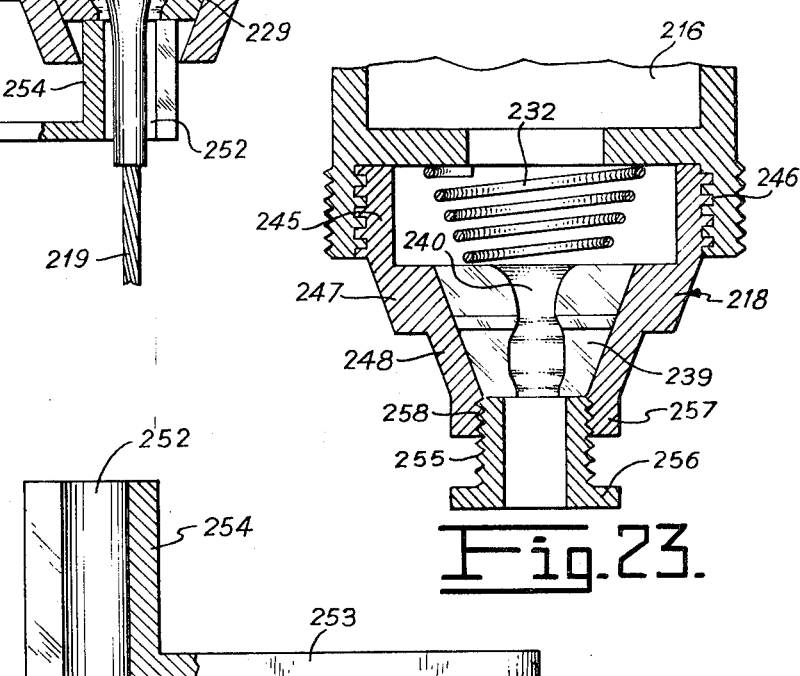
FIG. 23 is a view similar to anyone of FIGS. 18 through 22, showing a further embodiment of pushing tool to remove the dies from its operative position.

A highly preferred form of pushing tool to remove the dies from its operative position is clearly illustrated in FIG. 23 of the drawings and comprises a cylindrical projection 257 provided at the mouth of the die supporting member 18, said cylindrical projection 257 being provided with an inner thread 258 to threadably receive the externally threaded cylindrical section 255 of the pushing tool 256, which is provided in the form of a threaded sleeve with an enlarged head. This pushing tool forms an integral part of the machine of the present invention and is therefore highly preferable because it will avoid the necessity of carrying an additional tool which may be lost in transit. The manner in which said tool 256 operates to remove the dies from its operative position will be rather obvious and merely comprises the turning of tool 256 by hand or by means of a suitable wrench or the like, applied to the enlarged head thereof, in order to insert or extract the same through the projection 257 of the die supporting member 218.

It can be seen from the above that a highly simplified pressing process has been provided, as well as a highly improved type of apparatus to effect said process by extrusion, which avoids the necessity of repeated pressing steps as is the case with the traditional laterally acting dies. The improvements effected by the process and apparatus of the present invention are very important also in obtaining a uniform high quality of material, inasmuch as with the traditional presses and dies, extreme care is required, since if the pressure applied on any step exceeds certain limits, and since the diameter of the dies is smaller than the starting diameter of the ferrule, the latter is pressed such that radially extending projections are created between the flat portions of the dies, said projections creating a strain which exceeds the elastic limit of the material, which thereby badly cracks. If the ferrule is then turned to a 90° position, for instance, and is pressed again, the cracks will remain in the material and will weaken the coupling thus obtained. In effect, while the cracks formed in the previous pressing step may be disguised or even covered by the next pressing step, the defect will remain and may not be discovered unless gamma-ray analysis is practiced in the connector, which is rather impractical if a very large number of connectors are being handled. This very important disadvantage of the prior art pressing processes is completely avoided by the method and apparatus of the present invention, inasmuch as the opening of the dies will remain constant instead of variable as with prior art dies, and the connector member is merely extruded at relatively low pressure through said constant diameter opening, without undue deformation of the same which may create cracks and crystallographic defects in the material.

The machine of the present invention, on the other hand, is highly portable and compact and permits the carrying out of the process at the site of utilization of the couplings without the need of any complicated auxilliary equipment as was the case with the prior art couplings.

Although the invention has been shown and described in connection with certain specific embodiments thereof, it is to be understood that many modifications are possible. The invention, therefore, is not to be restricted except insofar as is necessitated by the prior art and by the spirit of the appended claims.

I claim:

1. An extrusion die assembly comprising a pair of die sections and a supporting block therefor; a die receiving frustoconical cavity in said supporting block having a wall forming an angle of from about 20° to about 25° to the axis thereof; said die sections having a semiconical form with its curved wall being complementary to half of said die receiving cavity, the flat contacting walls of each of said die sections being provided with transverse locking means to insure the accuracy of its relative axial position within said die receiving cavity, said flat walls being provided with complementary axial extruding portions which when mated form the extruding cavity of said die assembly, said extruding cavity being formed by an entrance backwardly flaring section having a radius of curvature of about 0.2 times the diameter of the extruding cavity, a first frustoconical extruding section whose wall forms an angle of from about 11° to about 15° with respect to the axis thereof, a second frustoconical extruding section whose wall forms an angle of from about 6° to about 7.5° with respect to the said axis, a cylindrical extruding section which determines the extruded final diameter of the extruded member, a pressure relieving cavity of enlarged diameter as compared to said cylindrical extruding section, and a guiding outlet section of cylindrical form having a diameter about 0.2 to 0.6 mm larger than the diameter of said cylindrical extruding section.

2. An extrusion die assembly according to claim 1 wherein said transverse locking means comprises a transverse spline integrally provided on one of said flat walls, and a groove complementarily provided on the other of said flat walls to mate with said spline.

3. An extrusion apparatus for fastening a connector member to a structural element with said structural element located within an axial bore provided in said connector member, comprising, in combination, hydraulic cylinder and piston means actuatable to force said connector member through an extruding cavity including an annular hydraulic cylinder open at both ends thereof and an annular piston reciprocable within said cylinder and open at both ends thereof; pusher means having a bore of a shape suitable to receive and push the tip of said connector member, removably arranged at the rearward end of said annular piston; guiding means to avoid warping of said connector member when driven by said pushing means through said extruding cavity said guiding means comprising a sleeve engaged by the forward end of said annular piston and having a diameter commensurate with the diameter of said connector member; extruding means coaxially located to said pushing means and comprising a die supporting member having a conical die receiving cavity therein, an extruding die assembly comprising at least two complementary die sections forming a conical die which is removably accommodated within said die receiving cavity, and means for displacing said die sections within said die receiving cavity so as to enlarge the extruding cavity thereof; and engaging means to interengage said hydraulic cylinder and piston means and said extruding means in a coaxial position, said engaging means comprising a cylindrical hollow body, fastening means at one end of said body, complementary fastening means at the operative end of said hydraulic cylinder and piston means to engage the latter at said end of said body, fastening means at the other end of said body to engage said die supporting member, said die supporting member comprising a frustoconical head having complementary fastening means at one end thereof and an open mouth at the other end thereof which serves as the die receiving cavity, an inwardly directed flange at an intermediate portion of said cylindrical body and having a central hole to allow passage of said piston, and resilient means one end of which bears on the said extruding die in order to resiliently support the same within said die receiving cavity.

4. An extrusion apparatus according to claim 3 wherein said pusher means is provided with a perforation passing from the bottom of said bore to the rearward end thereof in order to allow complete passage of said structural member through the apparatus and allow the fastening of said connector member at an intermediate section of said structural element.

5. An extrusion apparatus according to claim 3 wherein said means for displacing said die sections within said die receiving cavity comprises a cylindrical projection on the mouth of said die supporting member, a screw thread on the inner surface of said projection, and an externally threaded sleeve member arranged to act in association with said threaded projection to thereby displace said die sections upon the screw-type displacement of said sleeve into and out of said internally threaded projection.

6. An extrusion die assembly according to claim 1 wherein the wall of said first frustoconical extruding section forms an angle of 12° with respect to the axis thereof.

7. An extrusion die assembly according to claim 1 wherein the wall of said second furstoconical extruding section forms an angle of 6° with respect to the axis thereof.

* * * * *